United States Patent [19]
Nakayama et al.

[11] 3,784,444
[45] Jan. 8, 1974

[54] PROCESS FOR PRODUCING 2-SUBSTITUTED 6-AMINO PURINE RIBOTIDES

[75] Inventors: Kiyoshi Nakayama, Sagamihara; Haruo Tanaka, Machida, both of Japan

[73] Assignee: Kyowa Hakko Kogyo Co. Ltd., Tokyo, Japan

[22] Filed: Oct. 21, 1971

[21] Appl. No.: 191,158

[52] U.S. Cl............................................ 195/28 N
[51] Int. Cl............................................ C12d 13/06
[58] Field of Search............................... 195/28 N

[56] References Cited
UNITED STATES PATENTS
3,586,606  6/1971  Nakayama et al............... 195/28 N
3,308,036  3/1967  Nakayama et al............... 195/28 N Primary Examiner—Alvin E. Tanenholtz
Attorney—Joseph M. Fitzpatrick et al.

[57] ABSTRACT

Ribosyl phosphates of 2-substituted 6-amino purine derivatives are produced by fermentation of an aqueous nutrient medium containing a 2-substituted 6-amino purine derivative or the riboside thereof by organisms of the genera Brevibacterium, Corynebacterium, Arthrobacter and Micrococcus.

7 Claims, No Drawings

PROCESS FOR PRODUCING 2-SUBSTITUTED 6-AMINO PURINE RIBOTIDES

BACKGROUND OF THE INVENTION

The present invention relates to a process for producing ribotides by fermentation and more specifically, it relates to a process for producing ribosyl phosphates of 2-substituted 6-amino purine derivatives.

The products of the present invention are useful as medicinal agents. For example, one of the compounds which can be produced in the process of the present invention is 2-fluoroadenine-9-β-D-ribofuranoside-5'-phosphate which is the active form, in vivo, of 2-fluoroadenine or 2-fluoroadenosine, which are antitumor substances. The product inhibits synthesis of RNA [Shigeura, G.E. Boxer, S.D. Sampson & M.L. Meloni: Archives of Biochemistry and Biophysics, Vol. 111, pages 713–719 (1965)] and, in addition, is a useful compound as an intermediate product in the synthesis of other useful ribotides. A further example is 2-methyladenine-9-β-D-ribofuranoside-5'-phosphate which is important not only as a so-called trace nucleotide in the transfer RNA [R.W. Holley, J. Apgar, G.A. Everett, G.T. Madison, S.H. Merrill & A. Zamir: Cold Spring Harbor Symposia on Quantitative Biology, Vol. 28, pages 117–121 (1963)] but also as an intermediate product in the synthesis of other useful ribotides.

Heretofore, there has not been a process for producing ribotides using microorganisms and other processes known have not been commercially feasible.

SUMMARY OF THE INVENTION

The present invention provides an industrially inexpensive process for producing ribotides, and particularly ribosyl phosphates of 2-substituted 6-amino purine derivatives by fermentation using microorganisms belonging to the genera Brevibacterium, Corynebacterium, Arthrobacter and Micrococcus. The ribotides are accumulated in the culture medium and may be readily recovered therefrom.

The present inventors have found the phenomenon that when a certain microorganism as described above is cultured in a medium in the presence of a purine derivative having the following formula I or a riboside thereof, remarkable amounts of the ribotides represented by the following formula II are produced:

Formula I wherein R is $CH_3$ or a halogen

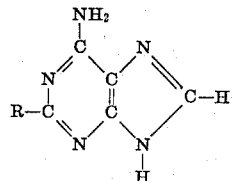

Formula II wherein $R_1$ is $CH_3$ or a halogen and

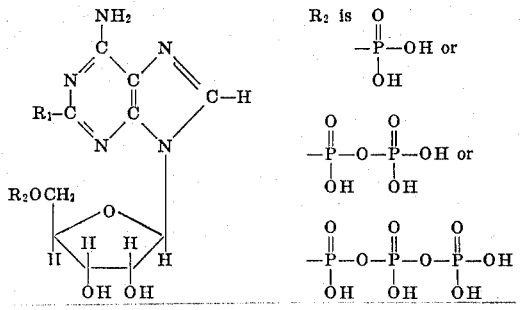

$R_2$ is
$$-\overset{O}{\underset{OH}{\overset{\|}{P}}}-OH \text{ or}$$
$$-\overset{O}{\underset{OH}{\overset{\|}{P}}}-O-\overset{O}{\underset{OH}{\overset{\|}{P}}}-OH \text{ or}$$
$$-\overset{O}{\underset{OH}{\overset{\|}{P}}}-O-\overset{O}{\underset{OH}{\overset{\|}{P}}}-O-\overset{O}{\underset{OH}{\overset{\|}{P}}}-OH$$

The organisms found useful in the present invention belong to the genera Brevibacterium, Corynebacterium, Arthrobacter and Micrococcus; all of which are found within the class Schizomycetes. Brevibacterium is a genus within the family Brevibacteriaceae, order Eubacteriales and is generally characterized by: short, unbranching rods; generally non-motile; type of motility of motile species is peritrichous or uncertain; sometimes chromogenic, with non-water-soluble reddish, reddish orange, yellow or brown pigments; may or may not reduce nitrates; glucose broth usually becomes acid; lactose not fermented; proteolytic action varies with the species; aerobic and facultatively anaerobic; rarely micro-aerophilic. Corynebacterium is a genus within the family Corynebacteriaceae, order Eubacteriales, and is generally characterized by: straight to slightly curved rods with irregularly stained segments, sometimes granules; frequently show club-shaped swellings, snapping division produces angular and palisade (picket-fence) arrangements of cells; non-motile with exceptions among the plant pathogens; Gram-positive, but sometimes young cells and sometimes old cells losing the stain easily; granules invariably Gram-positive; generally quite aerobic, but microaerophilic or even anaerobic species occur; catalase-positive; may or may not liquefy gelatin; may or may not produce nitrites from nitrates; may or may not ferment sugars, but seldom, if ever, is a high acidity produced; many species oxidize glucose completely to $CO_2$ and $H_2O$ without producing visible gas. Arthrobacter is a genus within the family Corynebacteriaceae, order Eubacteriales, and is generally characterized by: in young cultures the cells appear as rods which may vary in size and shape from straight to bent, curved, swollen or club-shaped forms; snapping division may show angular cell arrangement; short filament formation with rudimentary budding may occur, especially in richer liquid media; Gram-negative or Gram-variable, coccoid cells are characteristically observed in cultures after one or more days, these coccoid cells persist as the predominant form in older cultures and are Gram-negative to Gram-positive; larger coccoid cells which give rise to one or more rod-shaped cells on fresh transfer also occur; generally non-motile; growth on solid media soft or viscous; growth in liquid media generally not profuse; most species liquefy gelatin; little or no acid from carbo-hydrates; nitrites generally produced from nitrates; indole not produced; aerobic; most species show little or no growth at 37°C. Micrococcus is a genus within the family Micrococcaceae, order Eubacteriales and is characterized by: cells in irregular masses; the group is regarded as Gram-positive although some species lose their power to retain the stain so quickly that they are frequently reported as Gram-negative; some species are motile or show motile varieties; growth on agar usually abundant; some species form no pigment but others form yellow, orange or red pigment; catalase-positive so far as known; glucose broth slightly acid, lactose broth generally neutral; gelatin frequently liquefied, but never rapidly; saprophytic, facultatively parasitic or parasitic.

The invention is characterized in that a purine derivative of the above-noted formula I or the riboside thereof is added to the culture medium which is fermented by microorganisms belonging to any of the genera Brevibacterium, Corynebacterium, Arthrobacter and Micrococcus which are capable of converting the compounds of formula I or the ribosides thereof to the corresponding ribotides and same are accumulated in the medium and are thereafter recovered.

In determining whether a particular microorganism has the ability, a simple screening test is employed. That is, a method comprising culturing the candidate microorganism in a medium containing a precursor and determining the corresponding ribotides in the culture liquor. The determination of the ribotides is made by a conventional method, for example, by a combination of a paper chromatography and a measurement of ultraviolet absorption.

By way of example, a method using 2-fluoroadenine as a precursor is described below. The candidate microorganism is cultured in a medium containing 2-fluoroadenine for a certain period of time. The filtrate of the resultant culture liquor is subjected to a paper chromatography using Toyo Filter Paper No. 51A and a solvent system consisting of isobutyric acid, acetic acid and 1N aqueous ammonia (10:1:5 by volume). Under these conditions, the Rf values of 2-fluoroadenine-9-$\beta$-D-ribofuranoside-5'-monophosphate (hereinafter referred to as FAMP), 2-fluoroadenine-9-$\beta$-D-ribofuranoside-5'-diphosphate (hereinafter referred to as FADP) and 2-fluoroadenine-9-$\beta$-D-ribofuranoside-5'-triphosphate (hereinafter referred to as FATP) are respectively 0.45, 0.35 and 0.25. The portions corresponding to these Rf values are cut off from the filter paper and extracted with hot water. The ultraviolet absorption spectra of the resultant extraction liquors are produced and compared with those of FAMP, FADP and FATP. Spectra of FAMP, FADP and FATP are identical showing maximum absorption at 264 m$\mu$ at pH 2.0 and at 263 m$\mu$ at pH 7.0 and 11.0. In each case, a shoulder is exhibited at 270 m$\mu$.

Thus, FAMP, FADP and FATP can be detected and, further, the amounts of formed and accumulated FAMP, FADP and FATP in the culture liquor can be determined by calculation from the maximum ultraviolet absorbancy.

The culture medium employed in the present invention may be either synthetic or natural. For example, a medium containing a carbon source, such as saccharine materials, (for example, glucose, starch hydrolysate and molasses), a nitrogen source (for example, urea, ammonium chloride, ammonium sulfate and ammonium nitrate), an inorganic substance (for example, potassium dihydrogen phosphate, dipotassium hydrogen phosphate, magnesium sulfate, sodium chloride, ferrous sulfate, manganese sulfate and calcium carbonate) may be employed. Further, in some cases a nitrogen-containing natural substance, such as yeast extract, peptone, meat extract, fish meal, corn steep liquor, etc. may be added to the medium. When a nutrition-requiring strain is used, substances which satisfy the requirement must, of course, be present in the medium.

The compounds of the formula I or the ribosides thereof may be added to the above-mentioned medium before or during the course of fermentation. The compound may be added all at one time, intermittently during fermentation or continuously during the fermentation period. The said compounds or the ribosides thereof may be employed in various concentrations and a concentration ranging from 0.5 mg/ml to 10 mg/ml and is preferred.

Fermentation is carried out under aerobic conditions, such as by shaking culture, aeration-agitation submerged culture, etc. Culturing is preferably carried out at a temperature of 20° to 40°C. and at a pH of 4.0 to 9.5. However, these conditions of temperature and pH are not limiting and may vary according to the specific microorganism employed.

It is preferred that the microorganism be grown in a seed medium prior to being used for inoculation of the culture medium. The seed medium is incubated under favorable growth conditions for a period of time sufficient to develop a suitable organism population, typically for about 24 hours. The seed medium is then used to inoculate the culture medium. Fermentation is then carried out until a considerable amount of the desired ribotides are formed and accumulated in the resultant medium, usually 1 to 5 days. After the completion of culturing, the accumulated ribotides are isolated from the culture medium by known means such as adsorption on a strongly basic anion exchange resin and subsequent elution therefrom.

Practice of certain specific embodiments of the invention is illustrated by the following representative examples.

EXAMPLE 1

In this example, a strain of Brevibacterium ammoniagenes ATCC 6872, is cultured in a seed medium comprising 2% glucose, 1% peptone, 1% yeast extract, 0.3% NaCl and 30 $\mu$g/l of biotin at 30°C. for 24 hours. The thus prepared seed culture is inoculated in the amount of 10% by volume of fermentation medium into a 250 ml Erlenmyer flask containing 20 ml of a fermentation medium having a composite of: 100 g glucose, 6 g urea, 10 g $KH_2PO_4$, 10 g $K_2HPO_4$, 10 g $MgSO_4\cdot 7H_2O$, 0.1 g $CaCl_2\cdot 2H_2O$, 30 $\mu$g biotin and 10 g yeast extract dissolved into water to make up a total volume of 1 liter. The fermentation medium is adjusted to a pH of 8.0 with NaOH, and before inoculation is sterilized in an autoclave at a pressure of 1 Kg/cm$^2$ for 10 minutes.

After fermentation is carried out for 72 hours, 2-fluoroadenine is added to the medium in a concentration of 2 mg/ml and culturing is continued for an additional 48 hours. As a result, 0.80 mg/ml of FAMP, 1.41 mg/ml of FADP and 1.74 mg/ml of FATP are formed and accumulated in the fermentation liquor.

To isolate the accumulated products, the 2-fluoroadenine ribotides in the fermentation liquor are adsorbed on Dowex I (formic acid form) (a trade name of Dow Chemical, U.S.A.), which is a styrene type strongly basic anion exchange resin, and are thereafter eluted with an aqueous solution of ammonium formate into fractions. Each of the thus obtained fractions are concentrated to dryness to recover 2-fluoroadenine ribotides. The amounts of each of the ribotides obtained from 1 liter of the fermentation liquor are as follows:

FAMP — 220 mg
FADP — 450 mg
FATP — 510 mg

EXAMPLE 2

In this example, culturing is carried out in the same manner as in Example 1 except that 2-fluoroadenosine is used in place of 2-fluoroadenine. As a result, 0.50 mg/ml of FAMP, 1.21 mg/ml of FADP and 0.82 mg/ml of FATP are formed and accumulated in the culture liquor.

EXAMPLE 3

In this example, culturing is carried out in the same manner as in Example 1 except that a strain of Arthrobacter sp. ATCC 21085 is used as a seed strain in place of Brevibacterium ammoniagenes ATCC 6872. As a result, the amounts of 2-fluoroadenine ribotides formed in the culture liquor are:
FAMP — 0.71 mg/ml
FADP — 1.61 mg/ml
FATP — 1.32 mg/ml

EXAMPLE 4

In this example, culturing is carried out in the same manner as in Example 1 except that a strain of Corynebacterium sp. ATCC 21084 is used as a seed strain in place of Brevibacterium ammoniagenes ATCC 6872. As a result, the amounts of 2-fluoroadenine ribotides formed in the culture liquor are:
FAMP — ) 1.1 mg/ml
FADP — 0.82 mg/ml
FATP — 0.90 mg/ml.

EXAMPLE 5

In this example, culturing is carried out in the same manner as in Example 1 except that a strain of Micrococcus sodonensis ATCC 15932 is used as a seed strain in place of Brevibacterium ammoniagenes ATCC 6872. As a result, the amounts of 2-fluoroadenine ribotides formed in the culture liquor are:
FAMP — 1.20 mg/ml
FADP — 0.73 mg/ml
FATP — 0.53 mg/ml.

EXAMPLE 6

In this example, culturing is carried out in the same manner as in Example 1 except that 2-methyladenine is used in place of 2-fluoroadenine. As a result, 1.20 mg/ml of 2-methyladenine-9-β-D-ribofuranoside-5'-monophosphate (hereinafter referred to as MAMP), 1.10 mg/ml of 2-methyladenine-9-β-D-ribofuranoside-5'-diphosphate (hereinafter referred to as MADP) and 1.80 mg/ml of 2-methyladenine-9-β-D-ribofuranoside-5'-triphosphate (hereinafter referred to as MATP) are formed and accumulated.

One liter of the culturing liquor after removal of the microbial cells is adsorbed on Dowex I (formic acid form), a styrene type strongly basic anion exchange resin and are thereafter eluted with an aqueous solution of ammonium formate into fractions. The thus obtained fractions are concentrated to dryness to recover 2-methyladenine ribotides. The amount of yield is:
MAMP — 360 mg
MADP — 330 mg
MATP — 540 mg.

EXAMPLE 7

In this example, culturing is carried out in the same manner as in Example 6 except that 2-methyladenosine is used in place of 2-methyladenine. As a result, the amounts of 2-methyladenine ribotides formed in the culture liquor are:
MAMP — ) 0.58 mg/ml
MADP — 1.10 mg/ml
MATP — 0.60 mg/ml.

EXAMPLE 8

In this example, culturing is carried out in the same manner as in Example 6 except that strains of Corynebacterium sp. ATCC 21084, Arthrobacter citreus ATCC 11624 and Micrococcus sodonensis ATCC 15932 are respectively used as seed strains in place of Brevibacterium ammoniagenes ATCC 6872. As result, the amounts of 2-methyladenine ribotides formed in the culture liquor are shown in Table 1.

TABLE 1

| Strains used | Amount of 2-methyladenine ribotides formed (mg/ml) | | |
|---|---|---|---|
| | MAMP | MADP | MATP |
| Corynebacterium sp. ATCC 21084 | 0.60 | 1.14 | 1.32 |
| Arthrobacter citreus ATCC 11624 | 1.20 | 0.87 | 1.64 |
| Micrococcus sodonensis ATCC 15932 | 1.13 | 0.68 | 0.72 |

Accordingly, it will be recognized that the process of the present invention provides an industrially economic process for the production of ribotides.

What is claimed is:

1. A process for producing 2-substituted-6-aminopurine ribotides having the formula:

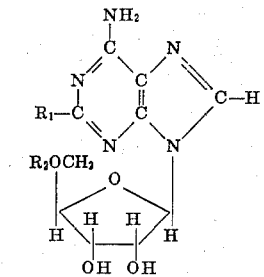

wherein $R_1$ is $CH_3$ or a halogen and $R_2$ is

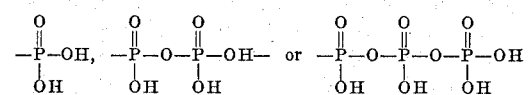

which comprises culturing a strain of microorganism belonging to the genus Brevibacterium, Corynebacterium, Arthrobacter or Micrococcus which is capable of producing said ribotides, in a nutrient medium in which a 2-substituted-6 aminopurine, having the formula:

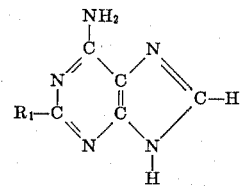

wherein $R_1$ is $CH_3$ or a halogen; or a riboside thereof is present, accumulating said ribotides in said culture medium and recovering said ribotides therefrom.

2. A process of claim 1 wherein said microorganism is Brevibacterium ammoniagenes.

3. A process of claim 1 wherein said microorgnism is Arthrobacter sp. ATCC 21085.

4. A process of claim 1 wherein said microorganism is Corynebacterium sp. ATCC 21084.

5. A process of claim 1 wherein said microorganism is Micrococcus sodonensis ATCC 15932.

6. A process of claim 1 wherein said microorganism is Arthrobacter citreus.

7. A process of claim 1 wherein said purine derivative is present in said culture in a concentration of from 0.5 mg/ml to 10 mg/ml.

* * * * *